(12) United States Patent
Kela et al.

(10) Patent No.: US 12,356,306 B2
(45) Date of Patent: Jul. 8, 2025

(54) APPARATUS, METHOD, AND COMPUTER PROGRAM

(71) Applicant: Nokia Technologies Oy, Espoo (FI)

(72) Inventors: Kalle Petteri Kela, Kaarina (FI); Ping-Heng Kuo, London (GB); Stefano Paris, Vanves (FR)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 17/759,861

(22) PCT Filed: Feb. 7, 2020

(86) PCT No.: PCT/EP2020/053088
§ 371 (c)(1),
(2) Date: Aug. 1, 2022

(87) PCT Pub. No.: WO2021/155947
PCT Pub. Date: Aug. 12, 2021

(65) Prior Publication Data
US 2023/0127463 A1   Apr. 27, 2023

(51) Int. Cl.
*H04W 40/02* (2009.01)
*H04L 1/08* (2006.01)

(52) U.S. Cl.
CPC .............. *H04W 40/02* (2013.01); *H04L 1/08* (2013.01)

(58) Field of Classification Search
None
See application file for complete search history.

(56) References Cited

U.S. PATENT DOCUMENTS

| | | | |
|---|---|---|---|
| 2012/0122405 A1* | 5/2012 | Gerber | H04W 52/0232 455/67.11 |
| 2018/0310202 A1 | 10/2018 | Lohr et al. | |
| 2019/0098533 A1 | 3/2019 | Babaei et al. | |

(Continued)

FOREIGN PATENT DOCUMENTS

| | | |
|---|---|---|
| CN | 106656312 A | 5/2017 |
| WO | 2021/028032 A1 | 2/2021 |
| WO | 2021/028064 A1 | 2/2021 |

OTHER PUBLICATIONS

"3rd Generation Partnership Project; Technical Specification Group Radio Access Network; NR; Packet Data Convergence Protocol (PDCP) specification (Release 15)", 3GPP TS 38.323, V15.6.0, Jun. 2019, pp. 1-26.

(Continued)

*Primary Examiner* — German Viana Di Prisco
(74) *Attorney, Agent, or Firm* — Barta Jones, PLLC

(57) ABSTRACT

A method comprises when a first data unit is to be transmitted on a plurality of different transmission paths determining, in dependence on at least one condition or indication if a) a copy of the first data unit is to be transmitted on one or more of the plurality of different transmission paths and/or if b) one or more coded data units are to be transmitted on one or more of the plurality of different transmission paths, a coded data unit being provided by coding the first data unit with at least one other preceding data unit. The method further comprises in dependence on said determining, causing the transmitting of one or more copies of the first data unit and/or one or more coded data units on respective ones of the plurality of different transmission paths.

9 Claims, 12 Drawing Sheets

(56) References Cited

U.S. PATENT DOCUMENTS

| | | | |
|---|---|---|---|
| 2019/0357196 A1 | 11/2019 | Majmundar et al. | |
| 2020/0153555 A1* | 5/2020 | Shi | H04L 1/08 |
| 2020/0322256 A1* | 10/2020 | Tang | H04W 28/0236 |
| 2021/0120478 A1* | 4/2021 | Akl | H04L 45/24 |
| 2022/0150755 A1* | 5/2022 | Zheng | H04W 76/12 |
| 2022/0159514 A1* | 5/2022 | Zhang | H04W 76/27 |

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 15)", 3GPP TS 36.323, V15.4.0, Jun. 2019, pp. 1-52.
Fragouli et al., "Network Coding Fundamentals", Now, 2007, 21 pages.
"3rd Generation Partnership Project; Technical Specification Group Radio Access Network; NR; NR and NG-RAN Overall Description; Stage 2 (Release 15)", 3GPP TS 38.300, V15.7.0, Sep. 2019, pp. 1-99.
"3rd Generation Partnership Project; Technical Specification Group Radio Access Network; Evolved Universal Terrestrial Radio Access (E-UTRA) and NR; Multi-connectivity; Stage 2 (Release 15)", 3GPP TS 37.340, V15.7.0, Sep. 2019, pp. 1-70.
"3rd Generation Partnership Project; Technical Specification Group Services and System Aspects; Service requirements for cyber-physical control applications in vertical domains; Stage 1 (Release 17)", 3GPP TS 22.104, V17.1.0, Sep. 2019, pp. 1-67.
"MAC CE format design", 3GPP TSG-RAN WG2 #107, R2-1909381, Agenda: 11.7.4, Ericsson, Aug. 26-30, 2019, pp. 1-3.
Ling, "Comparison of Several Algorithms for Computing Sample Means and Variances", Journal of the American Statistical Association, vol. 69, No. 348, Dec. 1974, pp. 859-866.
"Stage-2 running CR for support of NR Industrial IoT WI", 3GPP TSG-RAN WG2 Meeting #107bis, R2-1914009, Nokia, Oct. 14-18, 2019, 14 pages.
"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.
"Use cases and options for network coding in IAB", 3GPP TSG RAN Meeting #86, RP-192535, Agenda: 9.1.2, Intel Corporation, Dec. 9-12, 2019, 8 pages.
"New SID Proposal: Study on Network Coding Applications in NR", 3GPP TSG RAN meeting #86, RP-193220, Agenda: 9.1.2, Intel Corporation, Dec. 2-9, 2019, 4 pages.
Zhang et al., "5G Mobile Network Architecture for Diverse Services, Use Cases, and Applications in 5G and Beyond Deliverable D3.2", 5G-MONArch, Version 1.0, 2019, pp. 1-116.
Belschner et al., "A Hybrid Approach for Data Duplication and Network Coding", European Conference on Networks and Communications (EuCNC), Jun. 18-21, 2019, pp. 369-373.
"Survival Time Triggered PDCP Duplication", 3GPP TSG-RAN WG2 Meeting #105bis, R2-1903142, Agenda: 11.7.4, CATT, Apr. 8-12, 2019, pp. 1-3.
International Search Report and Written Opinion received for corresponding Patent Cooperation Treaty Application No. PCT/EP2020/053088, dated Oct. 27, 2020, 13 pages.
"Discussion on the application of Network Coding for efficient PDCP Duplication with more than 2 copies", 3GPP TSG-RAN WG3 Meeting #105, R3-194503, Agenda: 17.2.3, China Unicom, Aug. 26-30, 2019, 3 pages.
"Resource efficient data duplication", 3GPP TSG-RAN WG2 #103bis, R2-1814814, Agenda: 11.7.2, Ericsson, Oct. 8-12, 2018, 2 pages.
Notice of Allowance received for corresponding European Patent Application No. 20705017.0, dated Nov. 15, 2023, 7 pages.
Action received for corresponding European Patent Application No. 20705017.0, dated Jul. 20, 2023, 8 pages.

* cited by examiner

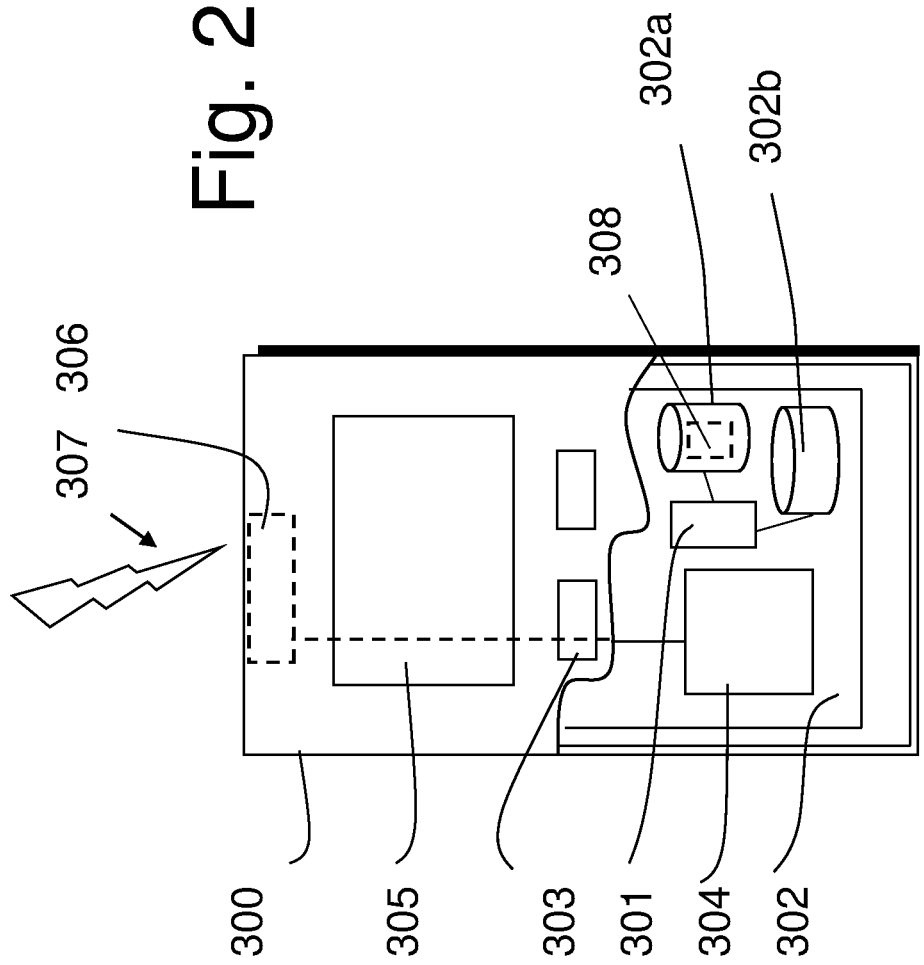

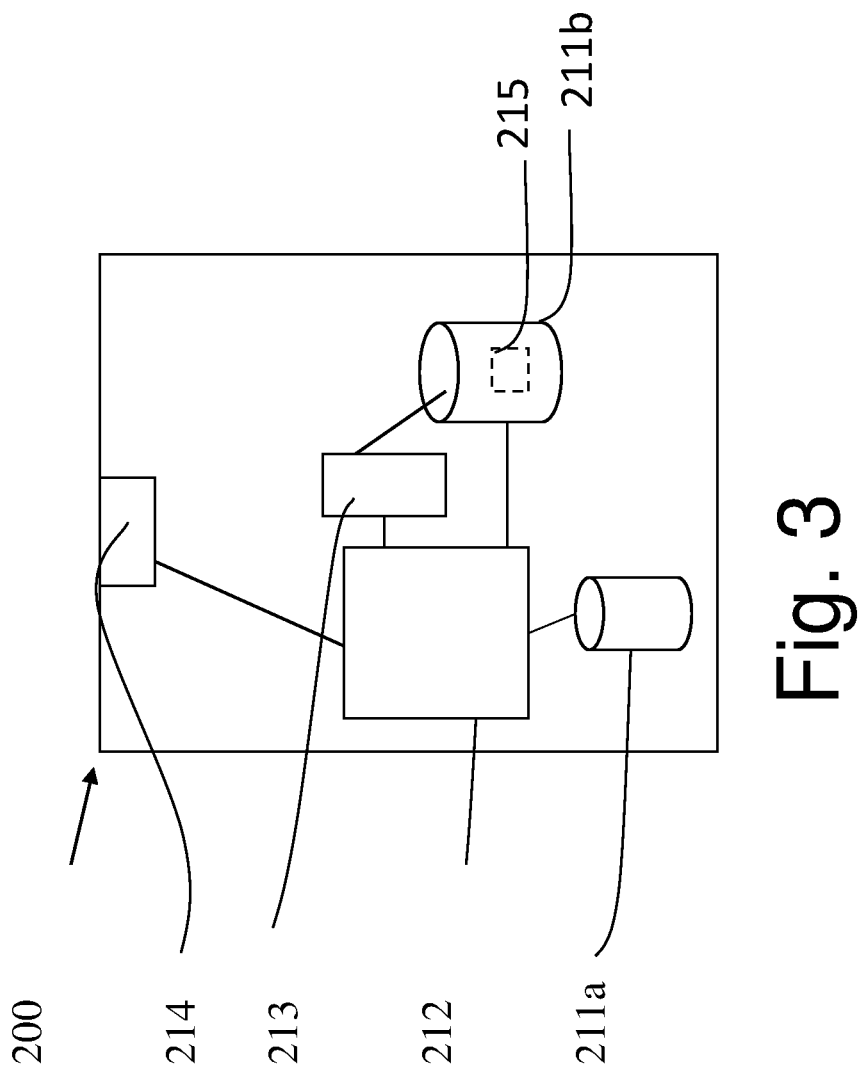

APPARATUS, METHOD, AND COMPUTER PROGRAM

RELATED APPLICATION

This application was originally filed as PCT Application No. PCT/EP2020/053088, filed on Feb. 7, 2020, which is incorporated herein by reference in its entirety.

FIELD OF THE DISCLOSURE

The present disclosure relates to an apparatus, a method, and a computer program and in particular but not exclusively for apparatus, methods and computer programs for use with data duplication.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a carrier provided by a station or access point, and transmit and/or receive communications on the carrier.

The communication system and associated devices typically operate in accordance with a given standard or specification which sets out what the various entities associated with the system are permitted to do and how that should be achieved.

SUMMARY

According to an aspect, there is provided an apparatus comprising: at least one processor and at least one memory including a computer program code, the at least one memory and computer program code configured to, with the at least one processor, cause the apparatus at least to: when a first data unit is to be transmitted on a plurality of different transmission paths determine, in dependence on at least one condition or indication if a) a copy of the first data unit is to be transmitted on one or more of the plurality of different transmission paths and/or if b) one or more coded data units are to be transmitted on one or more of the plurality of different transmission paths, a coded data unit being provided by coding the first data unit with at least one other preceding data unit; and in dependence on said determining, causing the transmitting of one or more copies of the first data unit and/or one or more coded data units on respective ones of the plurality of different transmission paths.

The data unit may be a data packet or a protocol data unit or a service data unit.

The at least one condition may be a time interval between an arrival of the first data unit and at least one other data unit.

The at least one memory and computer program code may be configured to, with the at least one processor, cause the apparatus at least to determine the time interval.

The at least one memory and computer program code may be configured to, with the at least one processor, cause the apparatus at least to compare the time interval to one or more thresholds to determine if one or more copies of the first data unit and/or one or more coded data units are to be transmitted on respective ones of the plurality of different transmission paths.

The at least one memory and computer program code may be configured to, with the at least one processor, cause the apparatus at least to determine, in dependence on how a preceding data unit was transmitted if one or more copies of the first data unit and/or one or more coded data units are to be transmitted on respective ones of the plurality of different transmission paths.

The at least one memory and computer program code may be configured to, with the at least one processor, cause the apparatus at least to receive the at least one indication, said at least one indication providing information to assist the apparatus to determine if one or more copies of the first data unit and/or one or more coded data units are to be transmitted on respective ones of the plurality of different transmission paths.

The indication may be received from a base station.

The indication may be received from a core network entity.

The indication may be received from a communications device.

The at least one indication may comprise traffic pattern information.

The information may be time-sensitive communication assistance information.

The at least one indication may comprise information identifying a respective data unit.

The information may be a sequence number of the respective data unit.

The at least one memory and computer program code may be configured to, with the at least one processor, cause the apparatus at least to duplicate the first data unit at a PDCP layer.

The at least one memory and computer program code may be configured to, with the at least one processor, cause the apparatus at least to cause the transmitting of one or more copies of the first data unit and/or one or more coded data units on respective ones of the plurality of different transmission paths by one or more base stations or by a communication device.

The apparatus may be provided in a base station.

The apparatus may be a base station.

The apparatus may be provided in a communications device.

The apparatus may be a communications device.

According to another aspect, there is provided an apparatus comprising means for: when a first data unit is to be transmitted on a plurality of different transmission paths determining, in dependence on at least one condition or indication if a) a copy of the first data unit is to be transmitted on one or more of the plurality of different transmission paths and/or if b) one or more coded data units are to be transmitted on one or more of the plurality of different transmission paths, a coded data unit being provided by coding the first data unit with at least one other preceding data unit; and causing, in dependence on said determining, the transmitting of one or more copies of the first data unit and/or one or more coded data units on respective ones of the plurality of different transmission paths.

The data unit may be a data packet or a protocol data unit or a service data unit.

The at least one condition may be a time interval between an arrival of the first data unit and at least one other data unit.

The means may be for determining the time interval.

The means may be for comparing the time interval to one or more thresholds to determine if one or more copies of the first data unit and/or one or more coded data units are to be transmitted on respective ones of the plurality of different transmission paths.

The means may be for determining, in dependence on how a preceding data unit was transmitted if one or more copies of the first data unit and/or one or more coded data units are to be transmitted on respective ones of the plurality of different transmission paths.

The means may be for receiving the at least one indication, said at least one indication providing information to assist in determining if one or more copies of the first data unit and/or one or more coded data units are to be transmitted on respective ones of the plurality of different transmission paths.

The indication may be received from a base station.

The indication may be received from a core network entity.

The indication may be received from a communications device.

The at least one indication may comprise traffic pattern information.

The information may be time-sensitive communication assistance information.

The at least one indication may comprise information identifying a respective data unit.

The information may be a sequence number of the respective data unit.

The means may be for duplicating the first data unit at a PDCP layer.

The means may be for causing the transmitting of one or more copies of the first data unit and/or one or more coded data units on respective ones of the plurality of different transmission paths by one or more base stations or by a communication device.

The apparatus may be provided in a base station.

The apparatus may be a base station.

The apparatus may be provided in a communications device.

The apparatus may be a communications device.

According to an aspect, there is provided a method comprising: when a first data unit is to be transmitted on a plurality of different transmission paths determining, in dependence on at least one condition or indication if a) a copy of the first data unit is to be transmitted on one or more of the plurality of different transmission paths and/or if b) one or more coded data units are to be transmitted on one or more of the plurality of different transmission paths, a coded data unit being provided by coding the first data unit with at least one other preceding data unit; and in dependence on said determining, causing the transmitting of one or more copies of the first data unit and/or one or more coded data units on respective ones of the plurality of different transmission paths.

The data unit may be a data packet or a protocol data unit or a service data unit.

The at least one condition is a time interval between an arrival of the first data unit and at least one other data unit.

The method may comprise determining the time interval.

The method may comprise comparing the time interval to one or more thresholds to determine if one or more copies of the first data unit and/or one or more coded data units are to be transmitted on respective ones of the plurality of different transmission paths.

The method may comprise determining in dependence on how a preceding data unit was transmitted if one or more copies of the first data unit and/or one or more coded data units are to be transmitted on respective ones of the plurality of different transmission paths.

The method may comprise receiving the at least one indication, said at least one indication providing information to assist determining if one or more copies of the first data unit and/or one or more coded data units are to be transmitted on respective ones of the plurality of different transmission paths.

The indication may be received from a base station.

The indication may be received from a core network entity.

The at least one indication may comprise traffic pattern information.

The information may be time-sensitive communication assistance information.

The at least one indication may comprise information identifying a respective data unit.

The information may be a sequence number of the respective data unit.

The method may comprise causing the apparatus at least to duplicate the first data unit at a PDCP layer.

The method may comprise causing the transmitting of one or more copies of the first data unit and/or one or more coded data units on respective ones of the plurality of different transmission paths by one or more base stations or by a communications device.

The method may be performed by an apparatus.

The apparatus may be provided in a base station.

The apparatus may be a base station.

The apparatus may be provided in a communications device.

The apparatus may be a communications device.

According to an aspect there is provided a computer program comprising computer executable code which when run on at least one processor is configured to cause any of the previously described methods to be performed.

According to an aspect, there is provided a computer readable medium comprising program instructions stored thereon for performing at least one of the above methods.

According to an aspect, there is provided a non-transitory computer readable medium comprising program instructions stored thereon for performing at least one of the above methods.

According to an aspect, there is provided a non-volatile tangible memory medium comprising program instructions stored thereon for performing at least one of the above methods.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Embodiments will now be described, by way of example only, with reference to the accompanying Figures in which:

FIG. 2 shows a schematic diagram of an example communication device;

FIG. 3 shows a schematic diagram of an example apparatus provided in an access node;

DETAILED DESCRIPTION OF THE FIGURES

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

As is known, wireless systems can be divided into cells, and are therefore often referred to as cellular systems. Typically, an access point such as a base station provides at least one cell. The cellular system can support communications between communications devices such as user equipment (UE).

In the following, different exemplifying embodiments will be described using, as an example of an access architecture to which the embodiments may be applied, a radio access architecture based on long term evolution advanced (LTE Advanced, LTE-A) or new radio (NR) (or can be referred to as 5G), without restricting the embodiments to such an architecture, however. It is clear for a person skilled in the art that the embodiments may also be applied to other kinds of communications networks. Some examples of other options for suitable systems are the universal mobile telecommunications system (UMTS) radio access network (UTRAN or E-UTRAN), long term evolution (LTE, the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

In the following certain embodiments are explained with reference to communications devices capable of communication via a wireless cellular system and communication systems serving such communications devices. Before explaining in detail, the exemplifying embodiments, some principles of an example wireless communication system, access systems thereof, and communications devices are briefly explained with reference to FIGS. 1 to 5.

Figure 1:
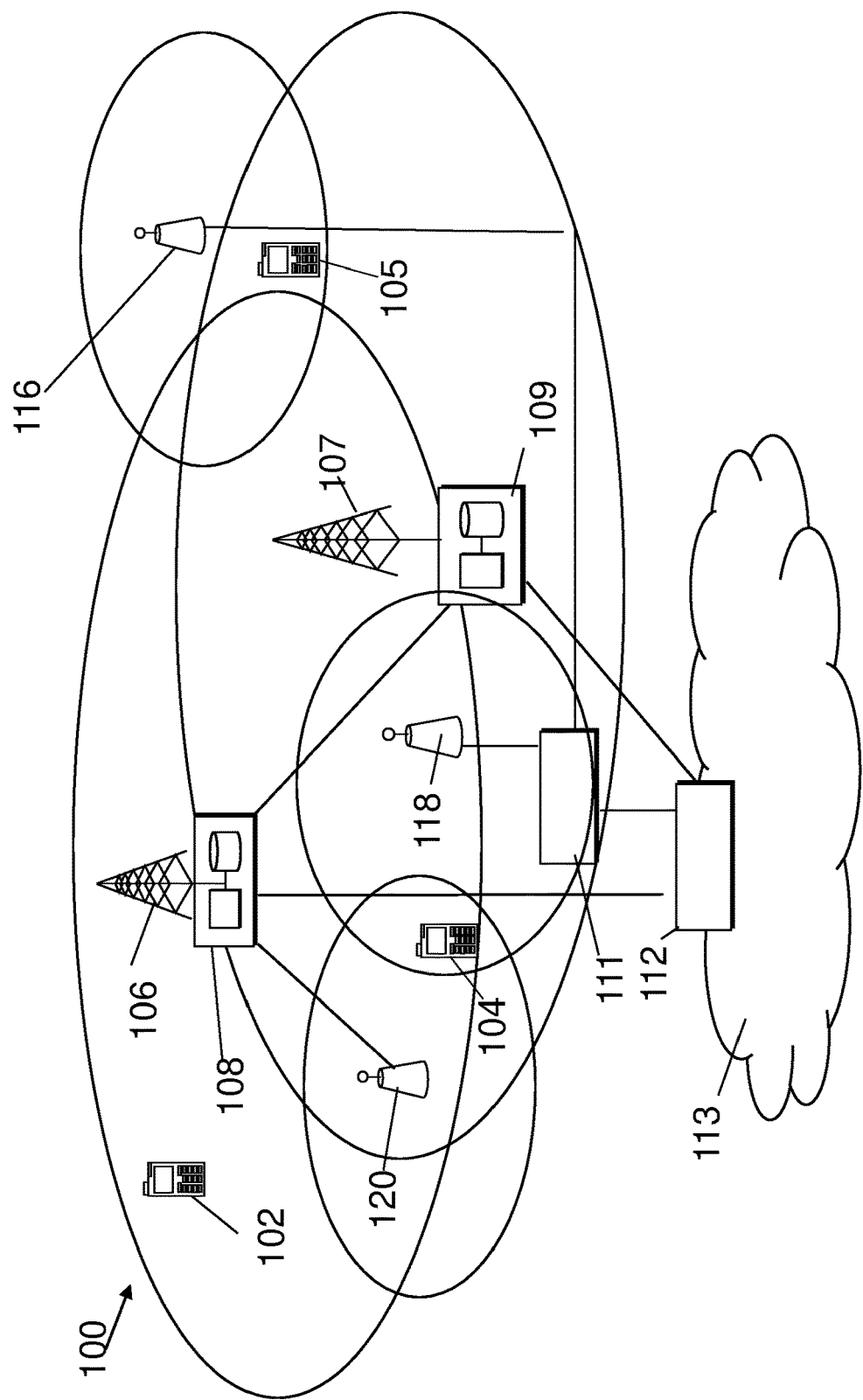
FIG. 1 shows a schematic diagram of an example communication system comprising a plurality of base stations and a communication device.

In a wireless communication system 100, such as that shown in FIG. 1, wireless communication devices, for example, user equipment (UE) or MTC (machine type communication) devices 102, 104, 105 are provided wireless access via at least one base station or similar wireless transmitting and/or receiving wireless infrastructure access node or point. Such an access node can be, for example, a base station or an eNodeB (eNB), or in a 5G system a Next Generation NodeB (gNB), or other wireless infrastructure node. These access nodes will be generally referred to as base stations. Base stations are typically controlled by at least one appropriate controller apparatus, so as to enable operation thereof and management of communication devices in communication with the base stations. The controller apparatus may be located in a radio access network (e.g. wireless communication system 100) or in a core network (CN) (not shown) and may be implemented as one central apparatus or its functionality may be distributed over several apparatus. The controller apparatus may be part of the base station and/or provided by a separate entity. In FIG. 1 control apparatus 108 and 109 are shown to control the respective macro level base stations 106 and 107. In some systems, the control apparatus may additionally or alternatively be provided in a separate entity.

In FIG. 1 base stations 106 and 107 are shown as connected to a wider communications network 113 via gateway 112. A further gateway function may be provided to connect to another network.

Smaller cell base stations 116, 118 and 120 may also be connected to the network 113, for example by a separate gateway function and/or via the controllers of the macro level stations. The smaller cell base stations 116, 118 and 120 may be pico or femto level base stations or the like. In the example, stations 116 and 118 are connected via a gateway 111 whilst station 120 connects via the controller apparatus 108. In some embodiments, the smaller stations may not be provided. In some embodiments, the cellular network may be at least partially made up of smaller sized cells.

The communication devices will be referred to as a UE (user equipment) in this document but it should be appreciated that the device may be any suitable communications device and the term UE is intended to cover any such device. Some examples of communications devices are discussed below and as used in this document the term UE is intended to cover any one or more of those devices and/or any other suitable device.

FIG. 2 illustrates an example of a communications device 300, such as the wireless communications devices 102, 104 and 105 shown on FIG. 1. The wireless communications device 300 may be provided by any device capable of sending and receiving radio signals.

Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, machine-type communications (MTC) devices, IoT type communications devices or any combinations of these or the like.

The device 300 may receive signals over an air or radio interface 307 via appropriate apparatus for receiving and may transmit signals via appropriate apparatus for transmitting radio signals. In FIG. 2 transceiver apparatus is designated schematically by block 306. The transceiver apparatus 306 may be provided for example by means of a radio part and associated antenna arrangement. The antenna arrangement may be arranged internally or externally to the mobile device.

The wireless communications device 300 may be provided with at least one processor 301 and at least one memory. The at least one memory may comprise at least one ROM 302a and/or at least one RAM 302b. The communications device may comprise other possible components 303 for use in software and hardware aided execution of tasks it is designed to perform, including control of access to and communications with access systems and other communications devices. The at least one processor 301 is coupled to the at least one memory. The at least one processor 301 may be configured to execute an appropriate software code 308 to implement one or more of the following aspects. The software code 308 may be stored in the at least one memory, for example in the at least one ROM 302a.

The processor, storage and other relevant control apparatus can be provided on an appropriate circuit board and/or in chipsets. This feature is denoted by reference 304.

The device may optionally have a user interface such as key pad 305, touch sensitive screen or pad, combinations thereof or the like.

Optionally one or more of a display, a speaker and a microphone may be provided depending on the type of the device.

Communication protocols and/or parameters which shall be used for the connection are also typically defined. The communications devices may access the communication system based on various access techniques.

An example apparatus is shown in FIG. 3. FIG. 3 shows an example of an apparatus 200 for a base station. The apparatus comprises at least one memory. The at least one memory may be at least one random access memory (RAM) 211a and/or at least one read only memory (ROM) 211b, at least one processor 212, 213 and an input/output interface 214. The at least one processor 212, 213 is coupled to the RAM 211a and the ROM 211b. The at least one processor 212, 213 may be configured to execute an appropriate software code 215 to implement one or more of the following aspects. The software code 215 may be stored in the ROM 211b.

Figure 4:
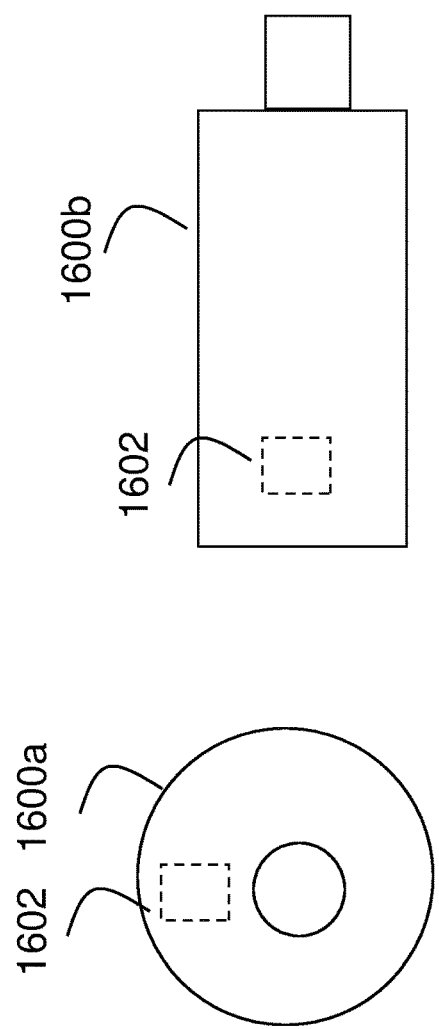
FIG. 4 shows a schematic representation of a non-volatile memory medium storing instructions which when executed by a processor allow a processor to perform one or more of the steps of the method of some embodiments.

FIG. 4 shows a schematic representation of non-volatile memory media 1600a (e.g. computer disc (CD) or digital versatile disc (DVD)) and 1600b (e.g. universal serial bus (USB) memory stick) storing instructions and/or parameters 1602 which when executed by a processor allow the processor to perform one or more of the steps of any of the methods of any of the embodiments.

Figure 5:
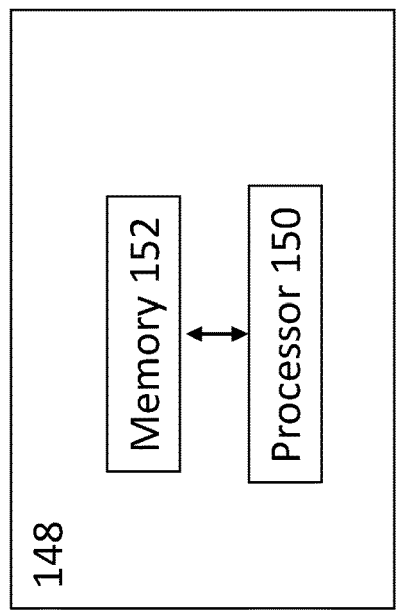
FIG. 5 shows an example apparatus which may be provided in a base station or a communications device or a network node.

FIG. 5 shows an apparatus 148. The apparatus 148 may be provided in the base station or in a communications device or in a core network node. The apparatus may comprise at least one processor 150 and at least one memory 152 including computer code for one or more programs. This apparatus may be configured to cause some embodiments to be performed.

Some embodiments may be provided in the relation to the so-called internet of things IoT or machine type communication scenarios. Some embodiments may be used with ultra-reliable low latency communication (URLLC) devices. Such devices may be used in MTC/IoT use cases (for example remote control, factory automation, automated guided vehicles etc.). Data duplication may improve latency and reliability in such scenarios.

Other embodiments may be provided in other contexts. Those contexts may be in regular cellular communication scenarios or in any other suitable communication scenario.

Some embodiments may be used in an uplink scenario and/or a downlink scenario.

Some embodiments may provide PDCP duplication for supporting applications where packet loss or exceeding of latency thresholds should be reduced or even avoided where possible. Some embodiments may be used for those applications which are less tolerant to packet loss or the exceeding of latency thresholds. For example, some industrial automation applications may be such that a packet loss or exceeding of latency thresholds may have undesirable consequences on the industrial system.

Some embodiments may consider the application of network coding mechanisms to the PDCP PDUs (protocol data units) duplicated by the PDCP layer, to further increase the packet reliability in multi-connectivity scenarios. Network coding is a networking technique in which the transmitted data is encoded and decoded. This may increase the network throughput, reduce delays and/or make the network more robust. Algebraic/linear algorithms may be applied to the data to accumulate the various transmissions in network coding.

A data duplication architecture, such as a dual-connectivity (DC) architecture, may increase an aggregated bandwidth to exploit spatial diversity for reliability increase and latency reduction (i.e. DC-based PDCP duplication).

Figure 6:
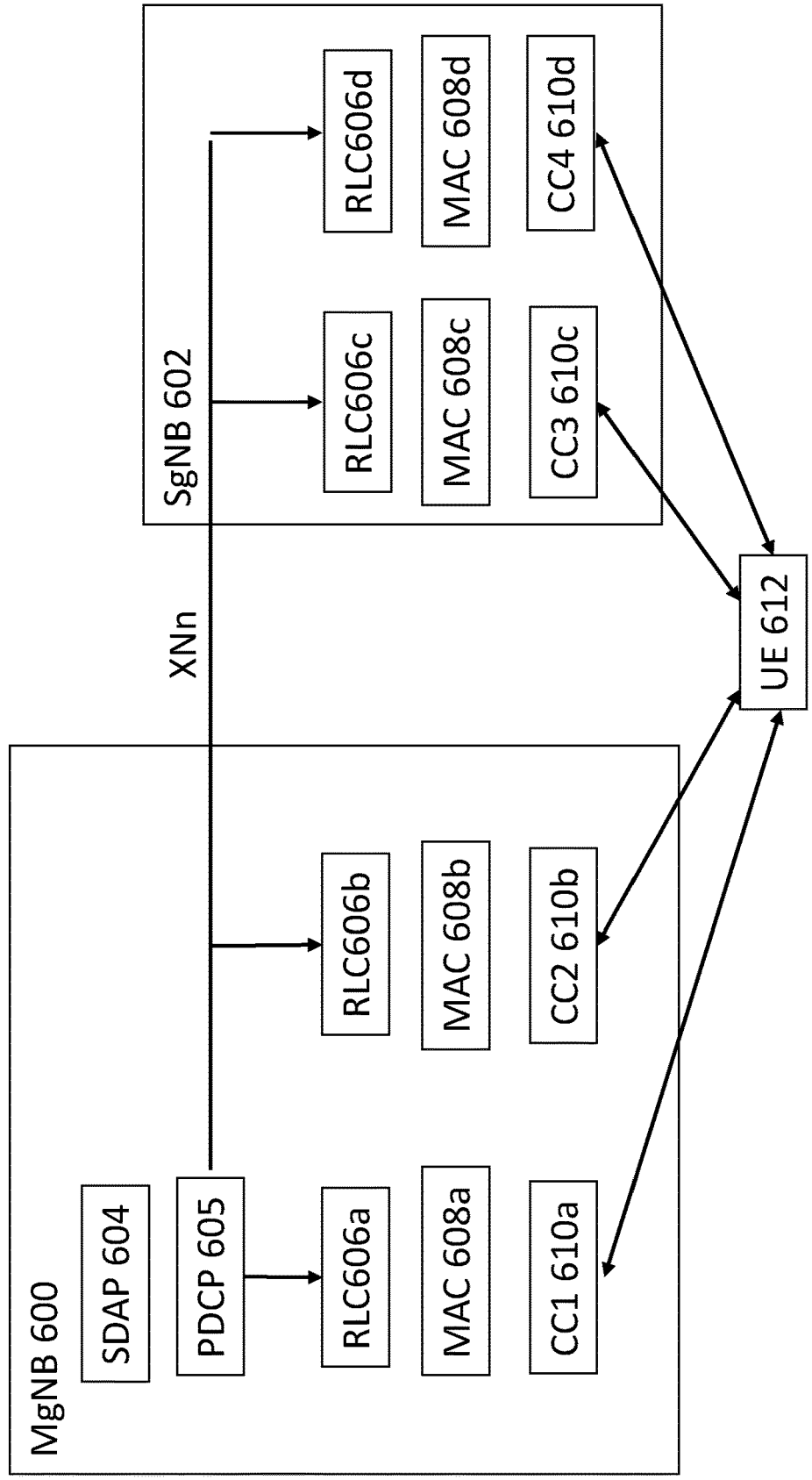
FIG. 6 shows two base stations supporting PDCP (packet data convergence protocol)

Reference is made to FIG. 6 which shows an example of two base stations. One base station is a hosting node, a master gNB (MgNB) 600 and the other base station is a secondary gNB (SgNB) 602. In dual-connectivity, a UE 612 is connected to the two gNBs and may be connected to multiple carrier components (CCs) within each gNB (i.e. in carrier aggregation within a node). The MgNB hosts a SDAP (service data adaption protocol) layer 604 for the DRB (dedicated radio bearer). The SDAP layer 604, in the downlink, receives data packets from the core network (CN) and passes them to the hosting PDCP layer 605 of the MgNB that controls the duplication of data packets. The MgNB 600 maintains the (main) RRC (radio resource control) control plane connection and signalling with the UE 612.

The MgNB 600 may activate a secondary gNB (SgNB) 602 to setup dual-connectivity for a UE based on, for example, one or more of radio quality, load levels, and QoS (quality of service) targets. The Xn interface is used to connect the two gNBs and to transfer the PDCP PDUs duplicated at the MgNB to the associated RLC (radio link control) entity(ies) at the SgNB. In the example of FIG. 6, there are two RLC entities 606c and 606d in the SgNB. The PDCP layer 605 is also arranged to transfer PDUs to a first and second RLC entities 606a and 606b.

Each RLC entity is associated with a respective MAC (medium access control) entity 608a, 608b, 608c and 608d. Each of the MAC entities is associated with a respective carrier component, CC1 610a, CC2 610b, CC3 610c and CC4 610d.

The MgNB may activate more than one secondary cells (SCells) on the SgNB. The RRC control plane messages are transmitted by the MgNB, The MgNB may be referred to as a primary cell (PCell). Configured secondary cells on one or both MgNB and SgNB may be used to increase bandwidth or exploit spatial diversity to enhance reliability and performance.

Downlink PDCP duplication may be operated in a way that the PDCP layer 605 in the MgNB 600 duplicates the downlink traffic, to deliver duplicated packets on the radio links (referred as transmissions legs) connecting different cells to the UE.

In the uplink, the MgNB 600 and/or SgNB 602 can indicate to the UE that it should duplicate uplink traffic by activating duplication and certain legs (RLC entities). The reliability can be increased in case of packet failures occurring on certain legs.

In some embodiments, the mechanism may be supported for a maximum of 2 legs (i.e. 2 copies).

In some embodiments, the mechanism may be supported for a maximum it to up to 4 legs, meaning that up to 4 copies of the same PDCP PDU of a radio bearer can be transmitted.

It should be appreciated that in other embodiments, a different number of legs or copies may be supported.

Assuming independent packet losses over different legs, PDCP duplication may result in an increasing reception probability of a PDU (i.e., the packet reliability) without incurring an additional latency since the duplicates can be transmitted simultaneously to the UE.

PDCP duplication and network coding may be used in combination.

Consider the following scenario. Packet A is to be transmitted followed by packet B.

In PDCP duplication over four legs with a combination of DC and CA will result in packet A being transmitted on all four of the component carriers.

In PDCP duplication over two legs will result for example packet A being transmitted on two of the component carriers, CC1 and CC2 and packet B being transmitted on two of the component carriers, CC3 and CC4.

In network coding options instead of just duplicating, consecutive packets A and B are coded together using for example XOR operation or forward error correction (FEC) method. This increases probability of successful decoding without increasing radio resource usage. For example CC1 would carry packet A, CC2 would carry the encoded packets combining packets A and B, CC3 would carry packet B and CC4 would carry the encoded packets combining packets A and B.

PDCP duplication may be provided in the downlink, in which the PDCP layer hosted e.g. in the master node receives a data packet from the SDAP entity, generates N identical PDCP PDUs and sends each copy to a distinct leg configured for the UE. The PDCP duplication approach may be modified using network coding. Distinct but consecutive PDCP PDUs may be encoded together to generate coded copies that are sent over one or more of the N legs.

In one example, the network coding may use an XOR operation. For example, each pair of consecutive PDUs, the XOR operation generates a new PDU by simply computing the logical XOR of the two PDUs.

In one example, the network coding may use an FEC coding operation. For example, the FEC scheme generates two coded packets (P and Q) as linear combinations of a pair of consecutive PDUs. The two independent linear combinations define two coding functions from which the two original PDUs may be applied. For example the FEC operation splits both PDUs in a sequence of chunks of the same size. The two coding functions are applied to every pair of chunks to generate two distinct coded chunks, and finally creates two coded PDUs by concatenating the coded chunks. By way of example, the first coding function applies the logical XOR operation. The second coding function may be based on a Reed-Solomon scheme.

In other examples, one coded packet may be transmitted and a copy of the PDU, without coding.

It should be appreciated that the FEC coding and XOR coding are examples of a coding function that may be used. However, other embodiments may use any suitable coding. The coding function may be such that the function is invertible so that the original data can be recovered from the coded data.

Network coding may increase communication reliability when PDCP duplication is utilized. There are some Industrial IoT related latency requirements that to some extent may be taken into account when considering network coding. Such requirement examples for mobile robots are given in Table 1 (see original table A.2.2.3-1 in 3GPP TS 22.104):

TABLE 1

Latency related service performance requirements for mobile robots (as in 3GPP TS 22.104)

| Use case # | End-to-end latency: maximum | Message size [byte] | Transfer interval: lower bound | Transfer interval: target value | Transfer interval: upper bound | Survival time |
|---|---|---|---|---|---|---|
| 1 | < target transfer interval value | 40 to 250 | − < 25% of target transfer interval value | 1 ms to 50 ms | + < 25% of target transfer interval value | target transfer interval value |
| 2 | < target transfer interval value | 15 k to 250 k | − < 25% of target transfer interval value | 10 ms to 100 ms | + < 25% of target transfer interval value | target transfer interval value |
| 3 | < target transfer interval value | 40 to 250 | − < 25% of target transfer interval value | 40 ms to 500 ms | + < 25% of target transfer interval value | target transfer interval value |

NOTE:
The transfer interval may not be strictly periodic in these use cases.
The transfer interval may deviate around its target value within bounds.
The mean of the transfer interval may be close to the target value.

PDCP network coding may require at least two consecutive packets for its coding. Hence, it is possible, e.g. with requirements given in Table 1, that when a new packet arrives for transmission, a previous packet's maximum latency has been exceeded. Some embodiments may use network coding even in scenarios such as set out above.

In some PDCP duplication methods, such as for NR, the submission of duplicates to lower layers is performed by the transmitting PDCP entity, and duplicate discarding is performed in the receiving PDCP entity when two or more copies with the same PDCP PDU sequence number (SN) are received. In the uplink, the network may control the use of duplication by a UE by sending a duplication activation MAC CE (control element) and SCell activation MAC CE, which activate the use of duplication and the corresponding RLC entity.

Where there are up to four legs, the MAC CE may be extended to control up to 4 RLC entities. This may for example be as follows:

| R = 0 | R = 0 | LCID = Advance duplication | | | |
|---|---|---|---|---|---|
| R | DRB | RLC_0 | RLC_1 | RLC_2 | RLC_3 |

In this example the MAC CE indicates 1 DRB and RLC activation status for the RB. LCID is the logical channel ID.

One example of a network coding scheme is XOR-based network coding, where the simple XOR operation is performed between two original data packets to form a coded packet. Alternative network coding schemes comprise forward error correcting (FEC)-based and more generally Random Linear (RL) coding schemes. Embodiments may be used with any coding scheme.

In some embodiments, the quality of service associated with one or more legs may be taking into when selecting if a leg will transmit a coded or uncoded version of a packet.

In some embodiments, end-to-end latency, for example URLLC latency, and/or survival time requirements may be taken into account when determining if network coding or simple duplication is to be used.

Some embodiments may change between network coding and simple duplication dynamically. Simple duplication refers to the case where the same packet or data unit is transmitted on two or more different carriers or legs. This may for example be the case with PDCP duplication. In some embodiments, it is determined if simple packet duplication is to be used, network coding is to be used or if a switch between network coding and packet duplication is to be used. This may be dependent on one or more of: packet inter-arrival times; and required end-to-end latency targets.

In some embodiments, the quality of service associated with one or more legs may be taking into when selecting if a leg will transmit a coded or uncoded version of a packet.
I In some embodiments, end-to-end latency, for example URLLC latency, and/or survival time requirements may be taken into account when determining if network coding or simple duplication is to be used.

In order to indicate whether transmission is coded or not a transmitter may signal coding identifications and sequence numbers to the receiver. This indication to the receiver may allow the receiver to identify that a) the received packet was coded, b) which original packets formed such coded packet and c) which coding function and parameters were used to form the coded packet. This is to enable the corresponding decoding and recovery of the original data at the receiver. The indication may be provided in any suitable way. For example, the indication can be provided dynamically within the packet. For example, this may be used for any one or more of indications a) to c). The indication may be provided by one or more of a flag, an index embedded in the PDCP header, and as a IE (information element). The IE may use some existing reserved bits in some embodiments.

At least some parts of this indication may be static or semi-static. This may be predefined and/or configured via RRC signaling.

In some embodiments, indications a) and b) may be provided in the packet. In some embodiments indication c) may be predefined and/or configured via RRC signaling.

In some embodiments in order to prioritize reliability or communication service availability, different parameterizations may be used when network coding is utilized.

For network coding, a plurality of threshold parameters for packet inter-arrival times may be provided. Such thresholds may be used to control whether to use network coding or not at the time a packet arrives for transmission.

In some embodiments, network coding may be implemented within PDCP layer and/or within a layer below the PDCP layer. This layer may below the PDCP layer may be provided in order to perform the network coding.

Figure 7:
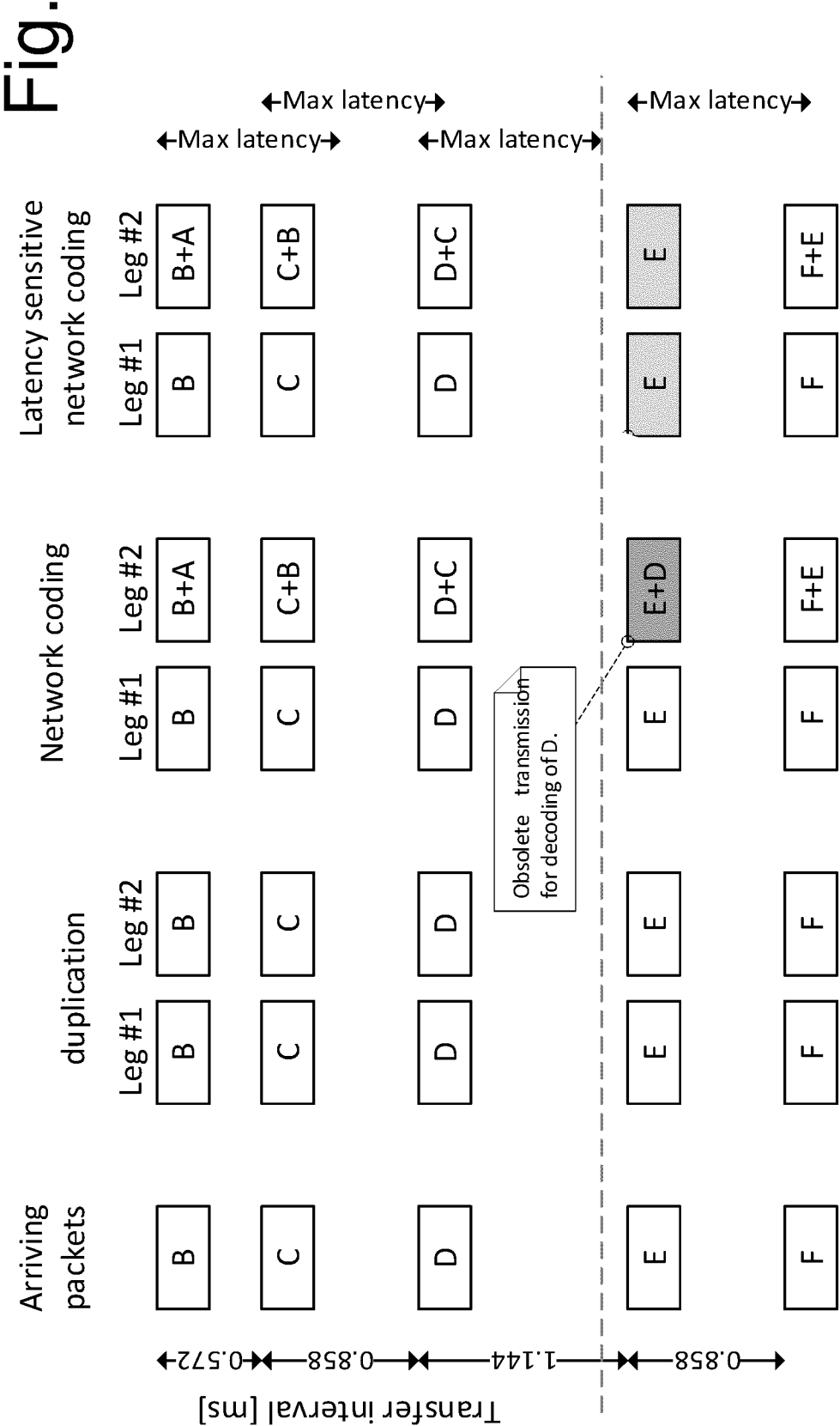
FIG. 7 illustrates for a series of packets, a packet duplication scenario, a network coding scenario and a scenario with latency sensitive network coding.

Reference is made to FIG. 7. FIG. 7 shows a series of arriving packets. A first packet A has already arrived and is followed by packets B to F. The timing interval between each packet is shown in FIG. 7. The timing interval between packets B and C is 0.572 ms, between packets C and D is 0.858 ms, between packets D and E is 1.144 ms, and between packets E and F is 0.858 ms. The maximum tolerated latency between packets is in this example 1 ms. In the example shown in FIG. 7, the time between packets B and C. between packets C and D and between packets E and F is less than the maximum latency of 1 ms. However, the time between packets D and E is greater than the maximum latency of 1 ms.

In FIG. 7, the behavior is shown over two legs in three different scenarios. In the first scenario, duplication is provided, where the same packet is duplicated on each leg. Thus, on leg 1, packet B is transmitted and on leg 2 packet B is transmitted. Packet C is then transmitted on leg 1 and 2 and so on.

In a second scenario, network coding is provided. On leg 1, packet B is transmitted and on leg 2 a network coded combination of packets A (the packet preceding packet A) and packet is transmitted. Then on leg 1, packet C is transmitted and on leg 2 a network coded combination of packets B and C is transmitted and so on. There is a relatively large time interval between the transmission of packets D and E. This means when packet E is transmitted on the first leg, the network coded combination of packets D and E is an obsolete transmission with respect to the decoding of packet D.

The third scenario of some embodiments, the transmission of the packets is as for the second scenario except for the transmission of the packet E. In this third scenario, packet E is sent on both the first leg and the second leg.

Some embodiments may use one or more thresholds. The one or more thresholds may be based on a threshold associated with of inter-arrival time of the packets (SDUs), which allows the transmitter to determine whether network coding or duplication should be applied. It should be noted that the network coding threshold $T_1$ of some embodiments can be also used for configuring PDCP duplication to provide simple duplication and as network coding as set out in the second scenario of FIG. 7. If the threshold is set to zero, then latency sensitive network coding may performs as set out in the first scenario. If the threshold is set to an infinite (or a very large value) or even a relatively large value, then the latency sensitive network coding may act as set out in the second scenario.

In one option, a single threshold $T_I$ may be used to compare to the instantaneous SDU (service data unit) inter-arrival time ($T_{SDU}$) and decide whether to code or duplicate a single data packet. $T_{SDU}U$ is the time between the arrival of the latest packet (i.e. the packet being processed) and the arrival of the previous packet. Hence, if $T_{SDU} < T_I$ (i.e., instantaneous SDU inter-arrival time is lower than network coding threshold), then network coding should be applied. In contrast, if $T_{SDU} \geq T_I$ (i.e., instantaneous SDU inter-arrival-time is at least equal to network coding threshold), then packet duplication should be applied.

If the network coding threshold is set to maximum end-to-end delay ($T_I = T_{E2E}$), then performance can be used in typical IIoT use cases such as discussed previously.

Figure 8:
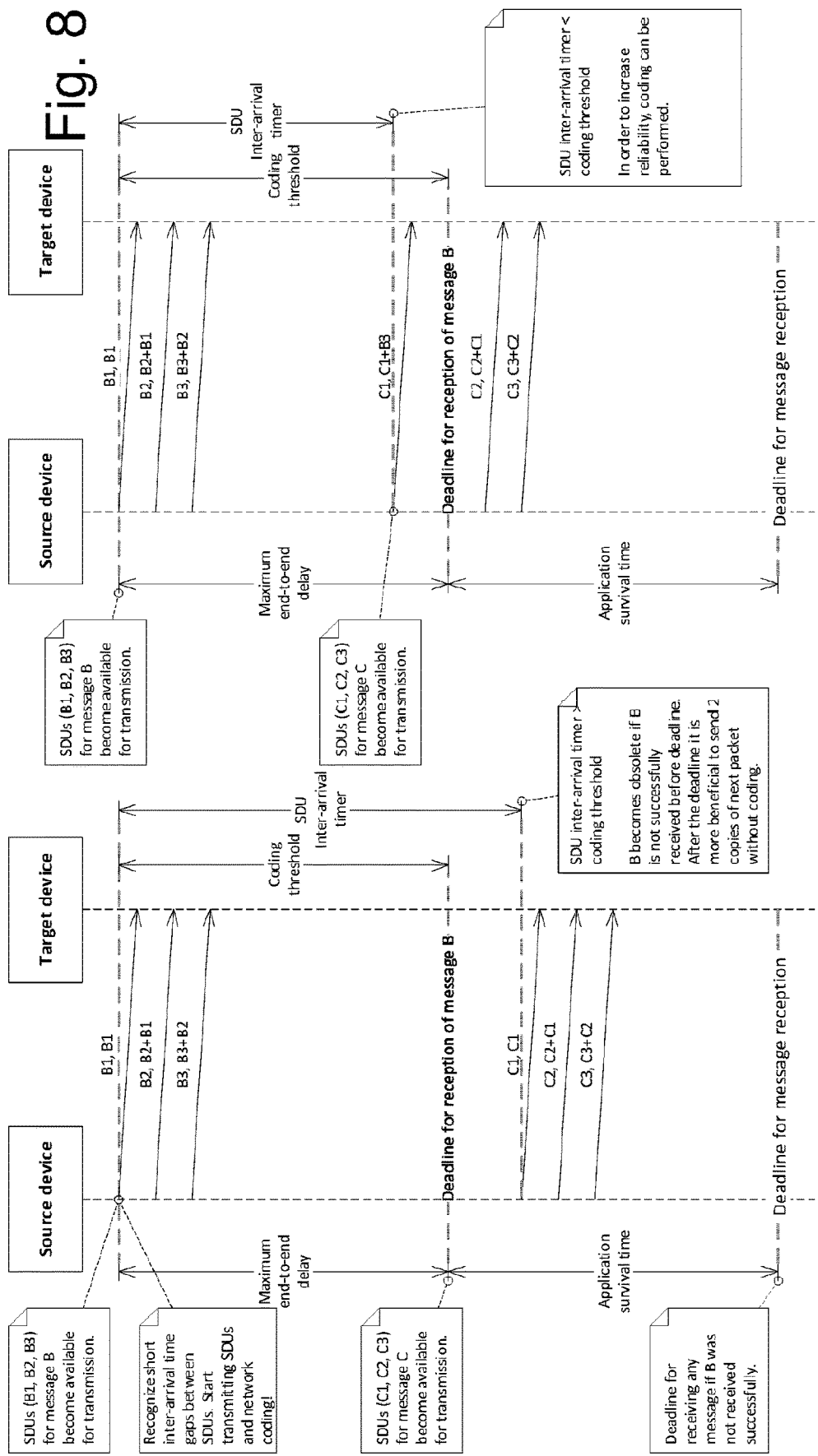
FIG. 8 shows two different examples using latency sensitive network coding.

Reference is made to which shows FIG. 8 which shows an example of latency sensitive network coding of some embodiments, In FIG. 8, two scenarios where a series of SDUs B1, B2, B3, C1, C2 and C3 are sent from a source device to a target device. SDUs B1, B2, B3, are for message B and SDUs C1, C2 and C3 are for message C. Note that in this Figure each arrow between the source device and the target device represents transmission over two legs so B1, B2 means that B1 is sent on one leg and B2 is sent on the other leg. B2+B3 means that a network coded packet based on packets B2 and B3 is sent on a leg. In this example, the fragments of a single message arrive with negligible difference in time. Hence shown SDU inter-arrival time represents inter-arrival time difference of B3 and C1.

A SDU inter-arrival timer is provided. The SDU inter-arrival timer is started/restarted when a new SDU becomes available for transmission. As depicted in FIG. 8 if SDU inter-arrival timer>network coding threshold (i.e., $T_{SDU} \geq T_I$), then simple packet duplication should be utilized. If SDU inter-arrival timer<network coding threshold (i.e., $T_{SDU}<T$), then network coding should be utilized. In other words, the transmitter waits for the next packet to arrive for the duration of "network coding threshold". If next packet does not arrive in time, simple packet duplication is applied instead of network coding for the next packet. In the example of FIG. 8, it is assumed that SDUs containing data from a single message arrive with negligible inter-arrival times. Separate messages on the other hand tend to arrive longer inter-arrival time. The inter-arrival time of messages may vary between some upper and lower bounds such as shown by way of example in Table 1.

Coding threshold parameter for the source device can be configured by the target device. Alternatively, source device may monitor packet inter-arrival times for high priority QoS flows with certain packet delay budget and rather quickly learn and adapt coding threshold to average message inter-arrival time. It would be also possible that coding threshold is set according to packet delay budget of a QoS flow.

In FIG. 8 in the first scenario (left drawing), the SDU inter-arrival timer>network coding threshold so for the first SDU of message C, SDU C1 is sent on both legs and then network coding is used for the next SDU. There is no benefit to sending a network coded combination of C1 and B3 as message B is now obsolete. It is therefore of more benefit to send two copies of packet C1 without any coding.

In FIG. 8 in the second scenario (right drawing), the SDU inter-arrival timer<network coding threshold so for the first SDU of message C, SDU C1 is sent on one leg and a network coded combination of C1 and B3 is sent on the other leg.

The coding threshold may represent the maximum end to end delay for a message from the starting of the SDU arrive timer from the sending of the first SDU of a message.

The coding threshold may represent the deadline for reception of a message, from the sending of the first SDU of a message.

Figure 9:
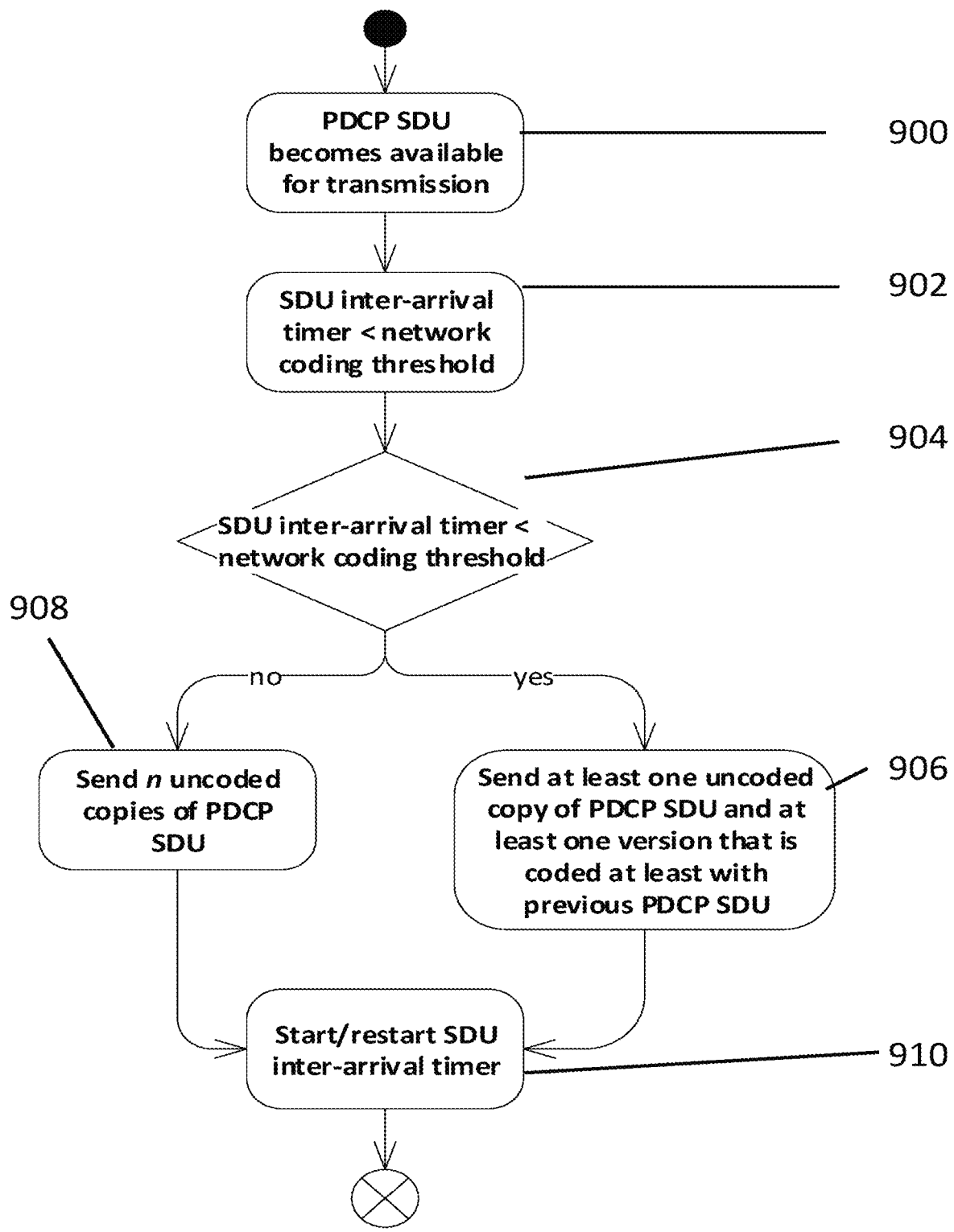
FIG. 9 shows a method of a first option.

Reference is made to FIG. 9 which shows a method for providing the first option.

In 900, a PDCP SDU becomes available for transmission.

In 902, the SDU interval arrival timer is compared to the network coding threshold.

In 904, it is determined if the SDU interval timer is greater or less than the network coding threshold. In practice, 902 and 904 may be provided in a single operation.

If it is determined that the SDU interval timer is less than the network coding threshold, then the method moves to 906. In 906, at least one encoded copy of the PDCP SDU and at least one version that is coded with the previous PDCP SDU are sent.

If it is determined that the SDU interval timer is not less than the network coding threshold, then the method moves to 908. In 908, n uncoded copies of the PDCP SDU and are sent. 906 and 908 are followed by 910 in which the SDU inter-arrival timer is started or restarted.

In another option, two thresholds $T_C$ and $T_D$ are used. $T_C<T_D$. A hysteresis mechanism is also used. The thresholds are used to decide whether to code or duplicate and the hysteresis mechanism is used to avoid rapid switching between coding and duplicating. If $T_{SDU}<T_C$ (i.e., instantaneous SDU inter-arrival time is lower that the lowest threshold), then network coding may be applied. If $T_{SDU} \geq T_D$ (i.e., instantaneous SDU inter-arrival-time is larger or equal to the largest threshold), then packet duplication should be applied. If $T_C \leq T_{SDU}<T_D$ (i.e., instantaneous SDU inter-arrival time is within the range defined by the two thresholds), then the same procedure applied to the previous PDU is applied. In other words if PDCP was in a coding state, coding is applied to the new PDU and if PDCP was in a duplication state, duplication is applied to the new PDU.

The thresholds may be configured also to ensure or improve instantaneous end-to-end latency. For example, if $T_D \leq T_I$ (i.e., the second threshold is lower or equal than the network coding threshold of the first option), the hysteresis mechanism ensures that the maximum end-to-end delay may be satisfied both for packet duplication and network coding.

Figure 10:
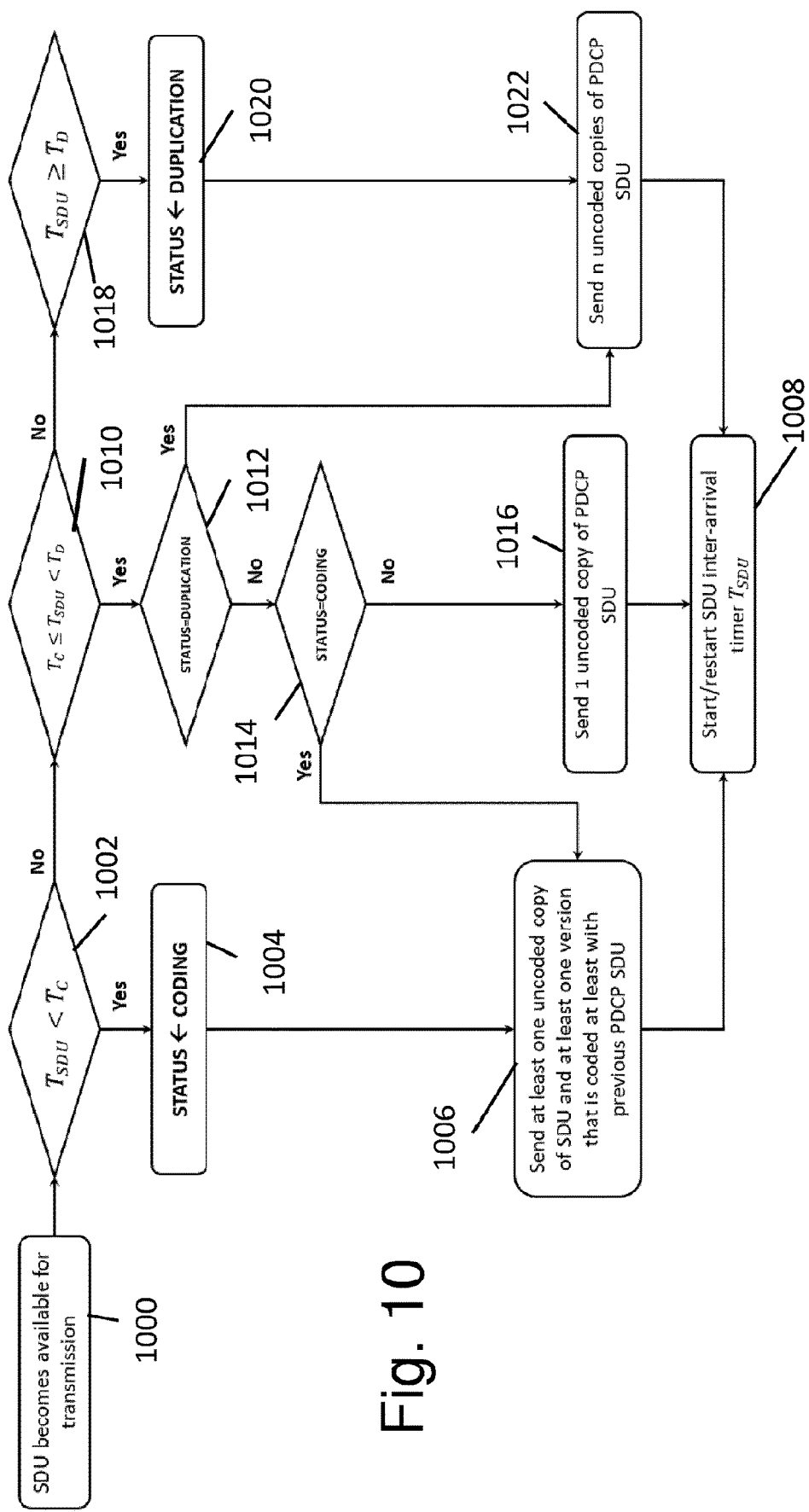
FIG. 10 shows a method of a second option.

Reference is made to FIG. 10 which shows a method for providing the second option.

In 1000, a SDU becomes available for transmission.

In 1002, a determination is made as to whether the SDU inter-arrival time is lower than first threshold, $T_{SDU}<T_C$.

If is determined that the SDU inter-arrival time is lower than first threshold, then this is followed by 1004 in the method where the status of the PDCP layer is set to coding.

In 1006, at least one uncoded copy of the SDU and at least one version that is coded with at least a previous PDCP SDU are sent.

This is followed by 1008, where the SDU interval arrival timer is started or restarted.

If it is determined in 1002 that the SDU inter-arrival time is not lower than first threshold, then the method proceeds to 1010. In 1010, it is determined if $T_C \leq T_{SDU}<T_D$. If so, the method proceeds to 1012.

In 1012, it is determined if the current status is a duplication status. If so, the method proceeds to 1022.

In 1022, n uncoded copies of the PDCP SDU are transmitted.

This is followed by 1008, where the SDU interval arrival timer is started or restarted.

If in 1012, it is determined if the current status is not a duplication status, the method proceeds to 1014.

In 1014, it is determined if the current status is a coding status. If it is determined that the current status is a coding status, then the method proceeds to 1006, as previously described.

If it is determined that the current status is not a coding status, then the method proceeds to 1016.

In 1016, one uncoded copy of the PDCP SDU is transmitted.

This is followed by 1008 of the method.

Going back to 1010, if is determined that $T_C \leq T_{SDU}<T_D$ is not satisfied, then the method proceeds to 1018.

In 1010 it is determined if $T_{SDU} \geq T_D$. If so then the method proceeds to determine that the status is a duplication status in 1020. In some embodiments, the method may proceed directly from 1010 to 1020.

The method then proceeds to 1022 as previously described.

If it is determined in 1010 that is not true, then the matter proceeds to 1018. In 1018 it is determined if this is the case. It will then be determined to the status is a duplication status.

When the SDU inter-arrival time is lower than first threshold, the status of the PDCP layer is set to coding to apply the coding operations on the current and the previous SDUs. Similarly, when the SDU inter-arrival time is larger or equal to the second threshold, the status of the PDCP layer is set to duplication to duplicate the SDU over two or more legs. These two states allow a decision to be made as to whether to code or simply duplicate. When the SDU inter arrival-time sits between the two thresholds, the status of the PDCP layer does not change and the same operation is maintained.

The thresholds of this second option may be configured to "guarantee" or improve instantaneous end-to-end latency. For example, if $T_D \leq T_I$ (i.e., the second threshold of this second option is lower or equal than the network coding threshold of the first option), the hysteresis mechanism may ensure that the maximum end-to-end delay is satisfied both for simple packet duplication and network coding.

In another option, a single threshold $T_P$ used to compare to the predicted SDU inter-arrival time ($T_{SDU}^P$) and decide whether to code or duplicate. The predicted SDU inter-arrival time can be predicted in any suitable manner. For example, the predicted SDU inter-arrival time may be predicted by estimating the average and standard deviation and taking the upper bound confidence interval as follows:

$$T_{SDU}^P = T_{SDU}^{AVG} + z_\alpha \frac{T_{SDU}^{STD}}{\sqrt{n}}.$$

In this formula, n is the number of SDU inter-arrival time samples, $T_{SDU}^{AVG}$ and $T_{SDU}^{STD}$ are the online average and standard deviation of $T_{SDU}$, respectively, $\alpha$ is the confidence level and $z_{\alpha/2}$ is the $\alpha/2$-percentile of for example the Normal distribution. The average and standard deviation of the SDU interarrival time can be estimated using Welford's algorithm or any other suitable algorithm. $T_{SDU}(i)$ is the SDU inter-arrival time of the i-th SDU. An algorithm that updates the average and the standard deviation, $T_{SDU}^{AVG}$ and $T_{SDU}^{STD}$ is described in the following function:

$$(T_{SDU}^{AVG}, T_{SDU}^{STD}, \mu, n) \leftarrow UpdateEstimate(T_{SDU}(i), \mu, n)$$

$$n \leftarrow n + 1$$

$$\delta_1 \leftarrow T_{SDU}(i) - \mu$$

$$\mu \leftarrow \mu + \frac{\delta_1}{n}$$

$$\delta_2 \leftarrow T_{SDU}(i) - \mu$$

$$\Delta \leftarrow \delta_1 \cdot \delta_2$$

$$T_{SDU}^{AVG} \leftarrow \mu$$

$$T_{SDU}^{STD} \leftarrow \frac{\Delta}{n}$$

Once $T_{SDU}^{AVG}$, and $T_{SDU}^{STD}$ have been updated, the method of the third options computes $T_{SDU}^P$ and compares it with the threshold $T_P$. If the predicted SDU inter-arrival time is lower than network coding threshold ($T_{SDU}^P < T_P$), then network coding should be applied. In contrast, if $T_{SDU}^P \geq T_P$ (i.e., predicted SDU inter-arrival-time is at least equal to network coding threshold), then packet duplication should be applied. The parameters, for example the threshold $T_P$ and/or the confidence level may be set to make the probability of exceeding the maximum end-to-end delay relatively small or negligible.

The method of the third option may be similar to that discussed in relation to FIG. 9. However, the method may be modified execute the updated estimate UpdateEstimate( ) after the arrival of a new SDU (for example between 900 and 902). Steps 902 and 904 may be modified to include the comparison between $T_{SDU}^P$ and $T_P$.

Threshold $T_P$, the confidence level $\alpha$, and the $\alpha/2$-percentile ($z_{\alpha/2}$) may be configured to make the probability of exceeding the maximum end-to-end delay negligible or relatively small. In particular, the probability that the next SDU inter-arrival time $T_{SDU}$ is larger than the predictor of the SDU inter-arrival time $T_{SDU}^P$ is equal to $\alpha/2$.

$$\frac{\alpha}{2} = P\left(T_{SDU} > T_{SDU}^{AVG} + z_{\frac{\alpha}{2}} \frac{T_{SDU}^{STD}}{\sqrt{n}}\right) = P(T_{SDU} > T_{SDU}^P)$$

For example, with $T_P = T_{E2E}$, $\alpha = 0.05$, and $z_{0.025} = 1.96$, the probability that the real value of the SDU inter-arrival time is larger than the value predicted by the predictor $T_{SDU}^D$ is 2.5%. Other example values are indicated in Table 2.

TABLE 2

Values of the confidence level $\alpha$, the $\alpha/2$-percentile ($z_{\alpha/2}$), and the probability of exceeding the predicted inter-arrival time.

| $\alpha$ | $z_{\frac{\alpha}{2}}$ | $P(T_{SDU} > T_{SDU}^P) = \frac{\alpha}{2}$ |
|---|---|---|
| 0.05 | 1.96 | 0.025 |
| 0.01 | 2.576 | 0.005 |
| 0.002 | 3.08 | 0.001 |
| 0.0004 | 3.49 | 0.0002 |

Table 2—Values of the confidence level $\alpha$, the $\alpha/2$-percentile ($z_{\alpha/2}$), and the probability of exceeding the predicted inter-arrival time.

The latter two options may provide more flexibility than the first option when the end-to-end latency is a time-average instead of an instantaneous constraint. If the distribution of the SDU inter-arrival times are known, the thresholds of the latter two options may be configured to determine statistically how many packets can satisfy the maximum end-to-end delay.

In some embodiments, the base station may acquire information relating to the traffic pattern of one or more DL (downlink) and/or UL (uplink) data flows in advance. For example, for IIoT use cases, such as set out in Rel-16 3GPP specifications, the base station may know when the packets would arrive in accordance with time-sensitive communication assistance information (TSCAI) obtained from the core network. This may allow the base station to perform more efficient resource allocation. Thus, as the inter-arrival time of packets with regular or periodic patterns are known in advance based on, for example, TSCAI, the base station may determine which packets (e.g. which sequence number) should be processed with network coding and which packets should be transmitted based on simple duplication. The base station may provide information or configuration relating to this determination to the UE. The UE is thus able to process the UL packets. For example, the process may dependent on the packet SN. This embodiment may not require any of the thresholds discussed previously relating to inter-arrival times. This embodiment may reduce the computation burden at one or both of the base station and the UE.

As can be seen from Table 1 above, the expected message sizes for Industrial Internet of Things (IIoT) may vary from 40 B up to 250 kB. If message sizes are relatively small, SDUs may tend to arrive at a relatively constant rate. For example, the rate may vary between transfer inter-arrival upper and lower bounds. If message sizes are relatively large, then SDUs may tend arrive for transmission in bursts. The inter-arrival times of the whole message may be between upper and lower bounds.

In IIoT use cases where the gNB is able to acquire TSCAI relating to certain traffic streams, the gNB may derive inter-arrival time of packets with periodic/regular traffic patterns.

Certain entities/functions in the core network may interact with the application layer and learn the anticipated traffic patterns of certain DL/UL traffic streams. This can be provided to the gNB for purposes of efficient scheduling. By way of example the core network entities/functions may be an UPF (user-plane function), AMF (access and mobility function), SMF (session management function), and/or the like.

In some embodiments, the gNB may receive TSCAI from the core network, e.g. during QoS flow establishment, or from another gNB during handover. TSCAI contains information about the traffic flow such as burst arrival time and burst periodicity. TSCAI knowledge may be used by the gNB's scheduler to more efficiently schedule periodic, deterministic traffic flows using one or more of configured grants, semi-persistent scheduling and dynamic grants.

In some embodiments, the gNB may directly identify whether a downlink/uplink packet should be processed with network coding or simple duplication based on its index (i.e. sequence number). This may be in accordance with its knowledge relating to patterns of upcoming DL/UL traffic (e.g. acquired from TSCAI). A UE may be configured so it can process UL packets properly based on the SN of the SDUs. For example, a UE could be configured to apply network coding for every N-th SDU (where N is integer), while apply simple duplication to other SDUs.

Figure 11:
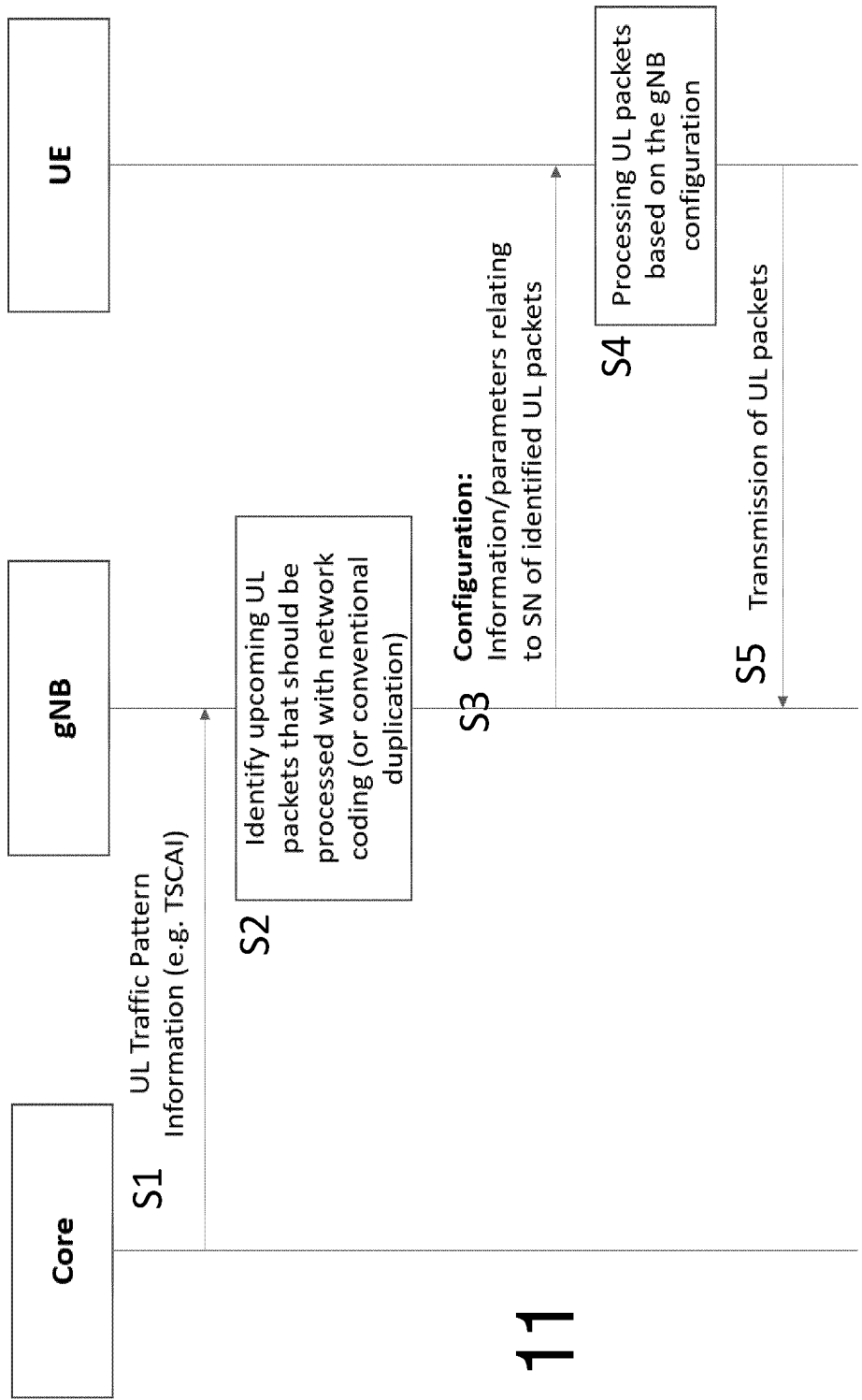
FIG. 11 shows a first signalling flow.

Reference is made to FIG. 11 which shows the signal flow in an embodiment where a UE is configured to determine how a SDU should be processed based on the sequence number, and such information could be derived by the gNB based on TSCAI.

In S1, the core is configured to provide UL traffic pattern information to the gNB. This may be any suitable information such as TSCAI or any other suitable information.

In S2, the gNB is arranged to identify upcoming UL packets that should be processed with network coding or with simple duplication.

In S3, the gNB is configured to send configuration information and/or one or more parameters relating to the SN of the identified UL packets.

In S4, the UE is configured to process the UL packets based on the gNB configuration. In S5, the UL packets are transmitted by the UE to gNB (using e.g. PUSCH (physical uplink shared channel) transmission). The packets are network coded or duplicated by the UE in dependence on the configuration information received by the UE from the gNB.

Figure 12:
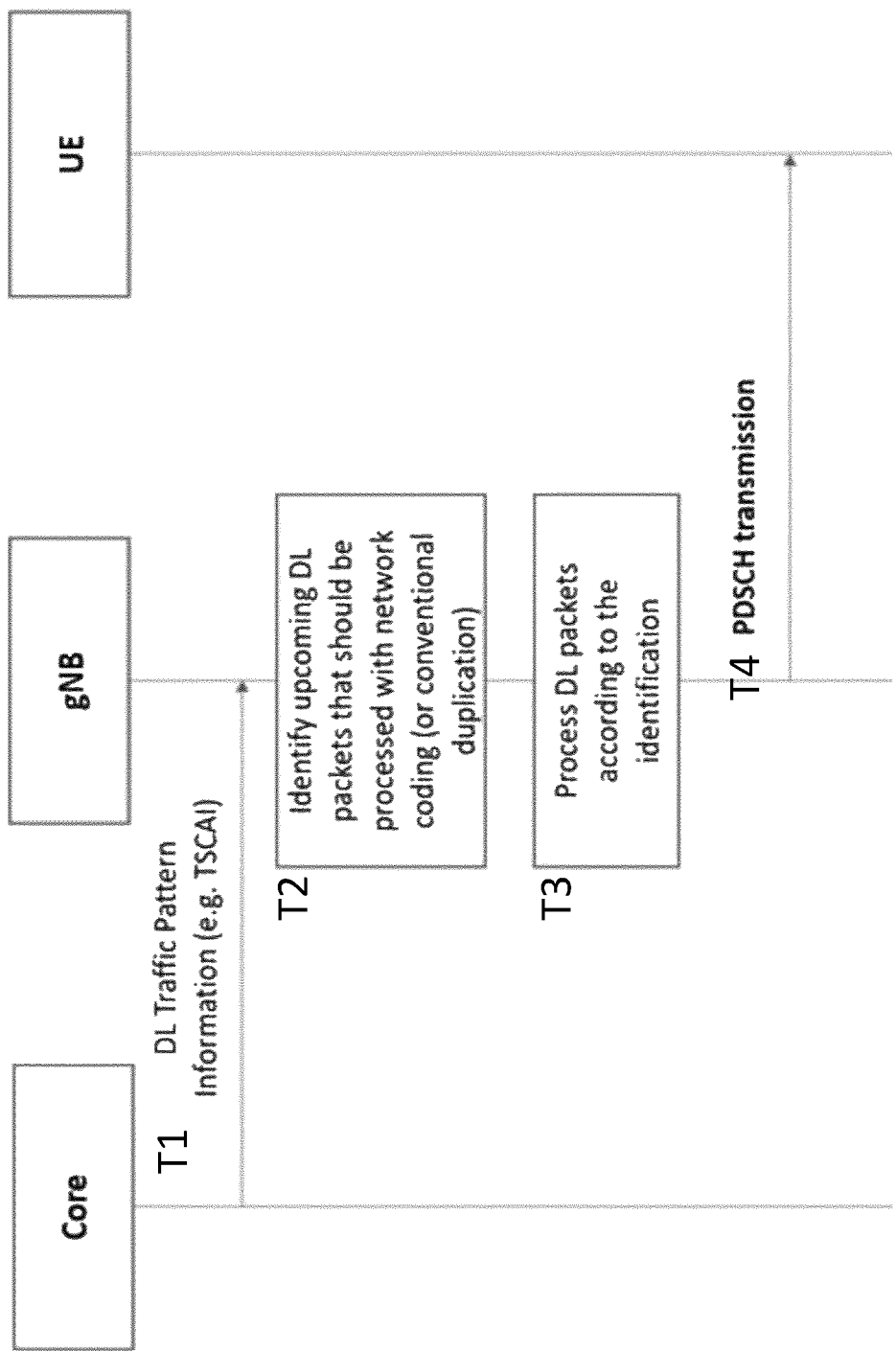
FIG. 12 shows a second signalling flow.

Reference is made to FIG. 12 which shows the signal flow in an embodiment where a gNB is configured to determine how a SDU should be processed based on its sequence number, and such information may be derived by the gNB based on for example the TSCAI.

In T1, the core is configured to provide downlink traffic pattern information to the gNB. This may be TSCAI information and/or any other suitable information.

In T2, the gNB is configured to determine upcoming DL packets that should be processes with network coding or simple duplication.

In T3, the gNB is configured to process the DL packet in dependence on the determination.

In T4, the gNB is configured to transmit the packets either with the network coding or duplication. This may be using a PDSCH transmission to the UE.

In example URLLC use cases, such as defined in 3GPP TS 22.104, message sizes may be so small that a single IP packet containing the whole message. Such IP packet fits within a single PDCP SDU. In some situation, the latency sensitive network coding of some embodiments may outperform simple duplication and network coding in reliability when for example the network coding threshold is set more or less equal to maximum packet end-to-end latency.

Where a single message becomes fragmented within multiple PDCU SDUs, then network coding may be set as a default and is used instead of PDCP duplication. This is because network coding can be utilized with multiple fragments of a single message.

3GPP TS 22.104 defines service availability as follows: "communication service availability: percentage value of the amount of time the end-to-end communication service is delivered according to an agreed QoS, divided by the amount of time the system is expected to deliver the end-to-end service according to the specification in a specific area".

In some cases, improving reliability might actually decrease service availability (as service availability is defined in 3GPP TS 22.104). In some cases, with small packets, duplication might perform better than network coding when exceeding survival time is to be avoided. This is because, in network coding, decoding success probability of a PDCP SDU is dependent on previous and next PDCP SDUs. Therefore, duplication may be better on avoiding failures of two or more non-fragmented consecutive small messages even though it may be worse in reliability. In some embodiments, the network coding threshold have to be set to zero (or near zero) for small messages in order to remove decoding dependency of adjacent PDCP SDUs containing separate messages. Then service availability may be improved.

Some embodiments provide a single methodology which can be configured for different requirements. This may be done by for example adjusting one or more thresholds. This may be dependent on the number of SDUs transmitted for each message and/or the size of each message.

When a single message is fragmented to multiple PDCP SDUs (for example at least 3 SDUs per message in this two-leg example), then options utilizing network coding may outperform PDCP duplication in service availability. If a single message fits within a single PDCP SDU or it is fragmented into two messages, then the coding threshold of latency sensitive network coding may be set to zero in order to decrease probability of errors for two or more consecutive messages.

Some embodiments may provide a method for configuring/varying multi-leg transmissions between network coding and packet duplication.

Some embodiments may provide an improved performance in one or more IIoT scenarios.

Some embodiments may utilize an inter-arrival timer for PDCP SDUs (or for other data packets on another protocol layer) when network coding is applied. Whether to use network coding or simple duplication may depend on inter-arrival timer that is restarted when a new message arrives for transmission.

Some embodiments may apply network coding with one or more previous PDCP SDU(s) when one or more conditions on the inter-arrival timer value is satisfied (e.g., instantaneous or predicted inter-arrival time is below certain threshold). Some embodiments may refrain from network coding with one or more previous PDCP SDU(s) when the one or more conditions on the inter-arrival timer values is not met (e.g., instantaneous or predicted inter-arrival time above the threshold).

Some embodiments may configure said network coding threshold value to a maximum end-to-end latency value.

In some embodiments, the network may configure or reconfigure network coding parameters and/or conditions on inter-arrival time e.g., thresholds, hysteresis mechanism, prediction algorithm) for the UE. This may be via RRC signalling.

In some embodiments, the packet SDU inter-arrival times are monitored. If it is detected that SDUs arrive in bursts (or it is otherwise indicated that the original message is larger than a single PDCP SDU), configure said threshold to average inter-arrival time of said bursts.

In some embodiments, there may be network configuring or reconfiguring of network coding conditions based on information/parameters relating to sequence number of packet SDUs.

In some embodiments, a configuration for the source device may be provided. The configuration may indicate whether reliability or service availability is to be prioritized over the other.

In some embodiments, if service availability is prioritized and it is determined that message sizes are below certain threshold (i.e. there is less than a threshold amount of PDCP SDUs per message), then PDCP duplication is used. The network coding threshold value may be set to zero.

In some embodiments, one way to determine that a message size is below a threshold is to monitor PDCP SDU inter-arrival times. For example, if the burst size is <3 PDCP SDUs, then duplication may be used. If the burst size is >2, then network coding may be applied.

It is noted that while the above describes example embodiments, there are several variations and modifications which may be made to the disclosed solution without departing from the scope of the present invention. In particular, different embodiments have been described. Different features from different embodiments may be combined.

Figure 13:
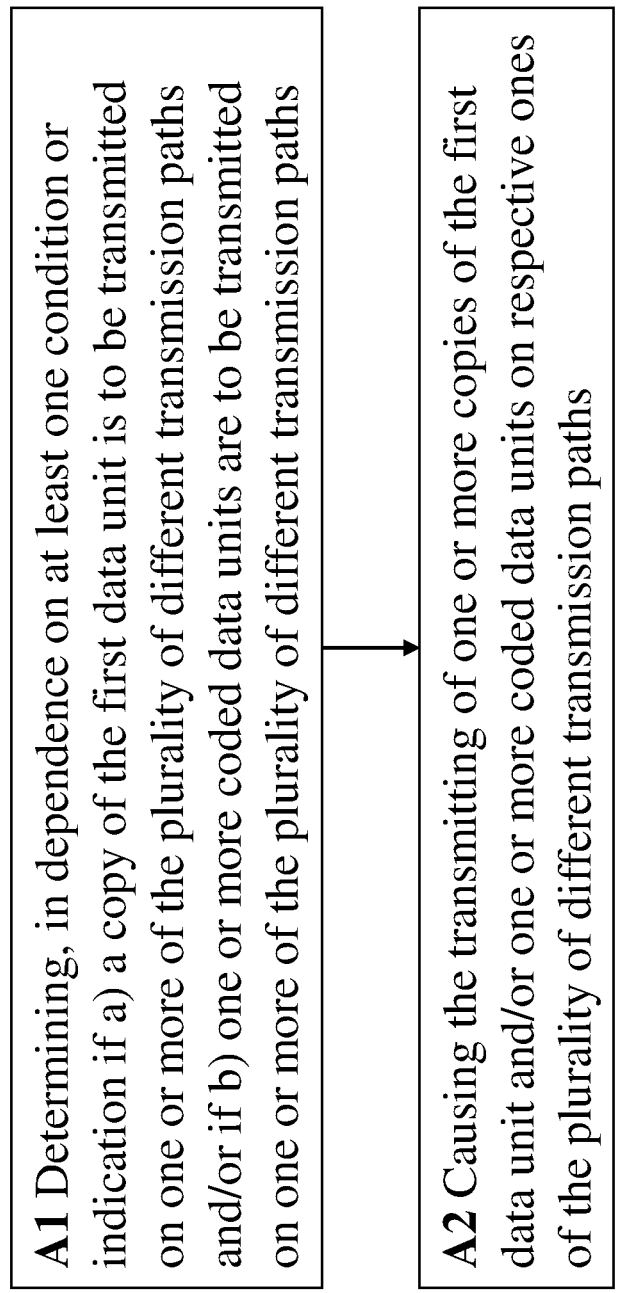
FIG. 13 shows a method of some embodiments.

Reference is made to FIG. 13 which shows a method of some embodiments. The method may be performed by an apparatus. The apparatus may be provided in a base station. The apparatus may be a base station. The apparatus may be provided in a communications device. The apparatus may be a communications device. The apparatus may be as shown in FIG. 5.

In A1, when a first data unit is to be transmitted on a plurality of different transmission paths, the method comprises determining, in dependence on at least one condition or indication if a) a copy of the first data unit is to be transmitted on one or more of the plurality of different transmission paths and/or if b) one or more coded data units are to be transmitted on one or more of the plurality of different transmission paths. A coded data unit may be provided by coding the first data unit with at least one other preceding data unit, In A2, in dependence on said determining, the method may comprise causing the transmitting of one or more copies of the first data unit and/or one or more coded data units on respective ones of the plurality of different transmission paths.

Some embodiments may determine that two or more different transmission paths are to be used to transmit a given packet or PDU or SDU or any other data unit.

The transmission on the two or more different transmission paths may be at more or less the same time.

The transmission path may be a so-called "leg" or component carrier or the like.

The transmission paths may be associated with the same or different cells.

The transmission paths may be associated with the same or different base stations.

It may be determined that simple duplication only is to be used where the given packet or PDU or SDU or any other data unit is transmitted on all of the two or more different transmission paths.

It may be determined that coding only is to be used where the given packet or PDU or SDU or any other data unit is coded with at least one preceding packet or PDU or SDU other data unit and is transmitted on all of the two or more different transmission paths.

In some embodiments, the same coded packet or PDU or SDU or other data unit is transmitted on all of the two or more different transmission paths. In some embodiments, two or more different coding functions are used such that different coded packets or PDUs or SDUs or other data units are transmitted on different ones of the different transmission paths. In this latter embodiment, a given coded packet or PDU or SDU or other data unit may be transmitted on only one of the transmission paths or two or more of the transmission paths.

In some embodiments, an uncoded packet or PDU or SDU or other data unit may be transmitted on one or more of the transmission paths and a coded packet or PDU or SDU or other data unit may be transmitted on one or more the transmission paths. The coded packet or PDU or SDU or other data unit which is transmitted on two or more transmission paths in this embodiment may be the same or different (resulting from different coding).

The transmission paths may be composed of one or more intermediate gNBs that relay packets between a UE and a gNB.

The embodiments may thus vary within the scope of the attached claims. In general, some embodiments may be implemented in hardware or special purpose circuits, software, logic or any combination thereof. For example, some aspects may be implemented in hardware, while other aspects may be implemented in firmware or software which may be executed by a controller, microprocessor or other computing device, although embodiments are not limited thereto. While various embodiments may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments may be implemented by computer software stored in a memory and executable by at least one data processor of the involved entities or by hardware, or by a combination of software and hardware. Further in this regard it should be noted that any of the above procedures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non limiting examples.

Alternatively or additionally some embodiments may be implemented using circuitry. The circuitry may be configured to perform one or more of the functions and/or method steps previously described. That circuitry may be provided in the base station and/or in the communications device and/or a network node.

As used in this application, the term "circuitry" may refer to one or more or all of the following:
(a) hardware-only circuit implementations (such as implementations in only analogue and/or digital circuitry);
(b) combinations of hardware circuits and software, such as:
  (i) a combination of analogue and/or digital hardware circuit(s) with software/firmware and
  (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some embodiments. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

What is claimed is:

1. An apparatus comprising: at least one processor and at least one memory including a computer program code, the at least one memory and computer program code configured to, with the at least one processor, cause the apparatus at least to:
when a first data unit is to be transmitted on a plurality of different transmission paths, determine, based on a time interval between an arrival of the first data unit and at least one other data unit is less than a threshold time and in dependence on how a preceding data unit was transmitted, a) a copy of the first data unit without any coding is to be transmitted on two or more of the plurality of different transmission paths associated with a same primary cell and different base stations and b) one or more coded data units are to be transmitted on two more of the plurality of different transmission paths, a coded data unit being provided by coding the first data unit with at least one other preceding data unit; and
in dependence on said determining, causing the transmitting of the copy of the first data unit without any coding on two or more of the plurality of different transmission paths associated with the same cell and the different base stations and the transmitting of the one or more coded data units on the two or more of the plurality of different transmission paths.

2. The apparatus as claimed in claim 1, wherein the data unit is a data packet or a protocol data unit or a service data unit.

3. The apparatus as claimed in claim 2, wherein the at least one memory and computer program code is configured to, with the at least one processor, cause the apparatus at least to determine the time interval.

4. A method comprising:
when a first data unit is to be transmitted on a plurality of different transmission paths determining, based on a time interval between an arrival of the first data unit and at least one other data unit is less than a threshold time and in dependence on how a preceding data unit was transmitted, a) a copy of the first data unit without any coding is to be transmitted on two or more of the plurality of different transmission paths associated with a same primary cell and different base stations and b) one or more coded data units are to be transmitted on two or more of the plurality of different transmission paths, a coded data unit being provided by coding the first data unit with at least one other preceding data unit; and
in dependence on said determining, causing the transmitting of the copy of the first data unit without any coding on two or more of the plurality of different transmission paths associated with the same cell and the different base stations and the transmitting of the one or more coded data units on the two or more of the plurality of different transmission paths.

5. The method as claimed in claim 4, comprising receiving at least one indication, said at least one indication providing information to assist determining that one or more copies of the first data unit and one or more coded data units are to be transmitted on respective ones of the plurality of different transmission paths.

6. The method as claimed in claim 5, wherein the at least one indication comprises traffic pattern information.

7. A non-transitory computer storage medium storing instructions which when run on one or more processors cause an apparatus to perform:
when a first data unit is to be transmitted on a plurality of different transmission paths determining, based on a time interval between an arrival of the first data unit and at least one other data unit is less than a threshold time and in dependence on how a preceding data unit was transmitted, a) a copy of the first data unit without any coding is to be transmitted on two or more of the plurality of different transmission paths associated with a same primary cell and different base stations and b) one or more coded data units are to be transmitted on two or more of the plurality of different transmission paths, a coded data unit being provided by coding the first data unit with at least one other preceding data unit; and in dependence on said determining, causing the transmitting of the copy of the first data unit without any coding on two or more of the plurality of different transmission paths associated with the same cell and the different base stations and the transmitting of the one or more coded data units on the two or more of the plurality of different transmission paths.

8. The non-transitory computer storage medium storing instructions as claimed in claim 7, comprising receiving at least one indication, said at least one indication providing information to assist determining if one or more copies of the first data unit and/or one or more coded data units are to be transmitted on respective ones of the plurality of different transmission paths.

9. The non-transitory computer storage medium storing instructions as claimed in claim 8, wherein the at least one indication comprises traffic pattern information.

* * * * *